Patented Mar. 1, 1949

2,462,900

UNITED STATES PATENT OFFICE 2,462,900

REDUCTION ACCELERATOR FOR THE SPONGE IRON ROTARY KILN PROCESS

John P. Riott, Pittsburgh, Pa.

No Drawing. Application September 30, 1946, Serial No. 700,181

4 Claims. (Cl. 75—33)

(Granted under the act of March 3, 1883, as amended April 30, 1928; 370 O. G. 757)

The invention described herein may be manufactured and used by or for the Government of the United States for governmental purposes without payment to me of any royalty thereon in accordance with the provisions of the act of April 30, 1928 (Ch. 460, 45 Stat. L. 467).

This invention relates to the production of metallic sponges of easily reducible metals, and more particularly to the production of sponge iron and similar sponge metals.

The reduction of iron ores, mill scale, mixed oxides, and the like by means of coal, coke, and similar reducing agents in the rotary kiln sponge iron process under normal operating conditions usually involves operating temperatures about 2000° Fahrenheit, and a processing time within that temperature range of approximately 80 minutes in order to produce highly metallized (approximately 95 percent) sponge iron. The term "percent metallization" or percent reduction will hereinafter refer to the ratio of metallic iron to the total iron present in the sponge iron produced.

Heretofore, it has been known that the addition of potassium or sodium carbonate to the ore-reducing agent charges, has a marked effect on diminishing the operating time of the process. However, the use of these particular compounds of potassium and sodium have the disadvantage of causing the sponge iron and char to ball or stick to the walls of the kiln; thereby making it impossible to discharge the products of the reaction in a normal manner.

Accordingly, it is the object of the invention to provide a method to accelerate the processing time for the production of sponges of easily reducible metals.

Another object of the invention is to provide a method whereby sticking and balling of the reactants, sponge iron, and char products is overcome so that these materials can be cooled and discharged in the usual manner.

Still another object of the invention is to produce highly metallized sponge iron at temperatures below those currently employed.

Other objects and advantages of the invention will in part be obvious and in part appear hereinafter in the detailed description of the invention, and the scope of the invention will be indicated in the claims.

These objects are accomplished in accordance with this invention wherein an accelerator selected from the group of alkali metal aluminates is added to the charge of the ore of an easily reducible metal and the reducing agent; and the blend so produced is then reduced at an elevated temperature. It has been found that this process will greatly accelerate the reaction time, prevent balling and sticking of the reactants and products, and produce a high degree of metallization in the metallic sponge.

The invention accordingly comprises the method of accelerating the reduction of metallic ores to produce sponge metals by the addition of alkali metal aluminates to the feed charge.

Suitable ores for reduction in accordance with this invention includes ores of metals which are capable of reduction with coke or other carbonaceous reducing agents at an elevated temperature. Examples of such include: Mill scale, oxides, carbonates, and the like of iron, copper, cobalt, nickel, cadmium, and other metals which can be reduced by carbonaceous reducing agents. In general, ores of metals of the iron group of the periodic system can be best treated in accordance with this invention, and of these, iron oxide constitutes a preferred member.

Suitable carbonaceous reducing agents for employment in accordance with this invention include charcoal, coals, petroleum coke, foundry coke, bitumen, and bituminous coals having coking characteristics. Organic compounds of carbon which carbonize at the temperature of operation, can also be employed.

Suitable accelerators for employment in accordance with the present invention include the alkali metal aluminates such as sodium aluminate, potassium aluminate, lithium aluminate, and the like; preferably sodium aluminate. Generally, it is preferred to use a quantity of alkali metal aluminate equal to about ½ to 5 percent of the weight of iron ore in the reducible feed charge; however, larger quantities of the accelerator will be operable but are economically impracticable.

In operation the reducing agent-iron ore feed charge is thoroughly comminuted with the selected finely divided (approximately minus 30 mesh or finer) alkali aluminate. Thereafter, the metal is smelted from the mixture by any convenient means of heating to reducing temperature. One simple way to carry out the reduction is to charge the mixture of alkali aluminate, the ore to be reduced, and carbonaceous reducing agent into a slightly inclined, brick-lined, internally heated rotary kiln. The feed mixture is charged into the elevated end of the rotary kiln and in passing through is heated to a temperature of the order of 2000° Fahrenheit. The reduced mixture is continually discharged near the lower end of the rotary kiln into a cooling or quenching device and is, in the case of iron, in a sponge like or granular form.

The following examples show how the invention may be carried out, but it is not limited thereto. Parts are by weight unless otherwise designated.

*Example I*

A charge comprising 200 parts of mill scale, 150 parts of foundry coke, and 7 parts of finely comminuted sodium aluminate (minus 30 mesh or finer) was prepared; this charge was processed in a rotary kiln at 1950° Fahrenheit. A highly metallized sponge iron (95 percent reduction or greater) was obtained within a period of 40 minutes; or in one half the time necessary for the reaction when sodium aluminate was not used.

The aforementioned example is not to be construed as limiting the weight of the sodium aluminate to a fixed percentage of any one of the charge constituents; greater or lesser reduction rates can be obtained by increasing or decreasing the amount of sodium aluminate in the charge materials as shown below by Example II.

*Example II*

A charge comprising 200 parts of mill scale, 150 parts of foundry coke, and 4 parts of finely comminuted sodium aluminate (minus 30 mesh or finer) was prepared and this charge processed as in Example I; a highly metallized sponge iron produce (95 percent reduction or greater) was obtained within an interval of 60 minutes.

If it is desired to operate at a lower temperature, Example III shows the effect of adding alkali aluminate to the feed charge of iron ore and reducing agent.

*Example III*

A charge comprising 200 parts mill scale, 150 parts foundry coke, and 7 parts finely comminuted sodium aluminate (minus 30 mesh or finer) was processed in a rotary kiln for 80 minutes at 1900° Fahrenheit. The sponge iron so produced was 95 percent or more metallized.

Low sulfur content of the iron sponge is often an important metallurgical consideration. Example IV illustrates a process for producing a low sulfur-bearing sponge iron with and without the addition of sodium aluminate.

*Example IV*

A charge comprising 200 parts mill scale, 150 parts foundry coke, 10 parts sized dolomite, and 7 parts finely comminuted sodium aluminate (minus 30 mesh or finer) was processed in a rotary kiln at 1950° Fahrenheit for 40 minutes. The sponge iron so produced was 95 percent (or greater) metallized and with a sulfur value in the range of 0.02–0.03 percent.

As shown in the foregoing description and examples, the production of highly metallized sponge iron is greatly accelerated by the addition of an alkali aluminate to the feed charge of ore and reducing agent. By this method it is also possible to produce sponge iron of a sufficient degree of metallization to meet many metallurgical requirements at temperatures lower than those normally employed in the rotary kiln process. Further, it is advantageous to use alkali aluminates as reduction accelerators in processes to produce low sulfur-bearing sponge iron.

While the invention has been particularly described in connection with the rotary kiln process for the production of sponge iron, its utility is not limited thereto, alkali aluminates when used in accordance therewith can be employed as well to the acceleration of ore reduction where balling and sticking of the reactants to the reactor interferes with the normal operation of the process.

While the invention has been particularly described in relation to the reduction of iron ore, it is likewise useful in the reduction of other similar metallic ores by means of carbonaceous reducing agents.

Since many apparently widely differing embodiments of the invention will occur to one skilled in the art, the invention is not limited to the specific details illustrated and described, and various changes can be made therein without departing from the spirit and scope thereof.

What is claimed is:

1. In a process for the production of a sponge metal by thermal reduction of a mixture of a metallic ore and a carbonaceous reducing agent, the step which comprises carrying out said reduction in the presence of at least one alkali metal aluminate.

2. In a process for the production of sponge iron by the thermal reduction of a mixture of oxidic iron ore and a carbonaceous reducing agent, the step which comprises carrying out said reduction in the presence of a minor amount of at least one alkali metal aluminate.

3. In a process for the production of sponge iron by the thermal reduction of a mixture of oxidic iron ore and a carbonaceous reducing agent, the step which comprises carrying out said reduction in the presence of sodium aluminate.

4. In a process for the production of sponge iron by the thermal reduction of a mixture of oxidic iron ore and a carbonaceous reducing agent, the step which comprises carrying out said reduction in the presence of a minor amount of finely divided sodium aluminate equal to not more than about 5 percent of the weight of the iron ore in said mixture.

JOHN P. RIOTT.

REFERENCES CITED

The following references are of record in the file of this patent:

UNITED STATES PATENTS

| Number | Name | Date |
|---|---|---|
| 2,085,178 | Acken | June 29, 1937 |

OTHER REFERENCES

"Industrial and Engineering Chemistry," December 1932, pages 1397–1400.